United States Patent [19]
Mori

[11] 4,269,482
[45] May 26, 1981

[54] SIMULTANEOUS MULTI-BEAM OPTICAL MODULATION SYSTEM

[75] Inventor: Masaaki Mori, Kawasaki, Japan
[73] Assignee: Ricoh Company, Ltd., Japan
[21] Appl. No.: 954,533
[22] Filed: Oct. 25, 1978
[30] Foreign Application Priority Data
Oct. 25, 1977 [JP] Japan .................. 52-127857
[51] Int. Cl.³ .................................. H04B 9/00
[52] U.S. Cl. ...................................... 350/358
[58] Field of Search .......................... 350/358
[56] References Cited
U.S. PATENT DOCUMENTS

| 3,727,062 | 4/1973 | Foster ........................ 350/358 |
| 3,744,039 | 7/1973 | Hrbek et al. ................ 350/358 |
| 3,935,566 | 1/1976 | Snopko ...................... 350/358 |

*Primary Examiner*—William L. Sikes
*Attorney, Agent, or Firm*—McGlew and Tuttle

[57] ABSTRACT

The simultaneous multi-beam optical modulation process comprises the steps of producing a dummy signal in such a manner that the sum of a plurality of signals and the dummy signal is kept constant, modulating the amplitudes of assigned carriers by the dummy signal and the plurality of the signals so as to produce a modulated output and applying the modulated output to an acoustic optical element. An apparatus for carrying out the process is also disclosed.

1 Claim, 6 Drawing Figures

SIMULTANEOUS MULTI-BEAM OPTICAL MODULATION SYSTEM

BACKGROUND OF THE INVENTION

The present invention relates to a simultaneous multi-beam light modulation system, which can be employed in a laser printing apparatus.

In a well-known simultaneous multi-beam light modulation system, a plurality of image signals are assigned to carriers, respectively and the amplitude of each carrier is modulated, whereby a plurality of modulated signals are produced, and at the same time, by the modulated signals, an acoustic optical element is actuated, so that a laser beam is divided and modulated by the acoustic optical element. This system is employed in a laser printing apparatus and is practical for use in lowering the deflection speed of a scanning optical deflection apparatus. In this system however, since the acoustic optical element is actuated simultaneously by a plurality of modulated signals, the light modulation intensity of each image signal is changed under the influence of the other image signals, so that cross modulation occurs between the multiple beams from the acoustic optical element.

Under the circumstances, a system as shown in FIG. 1 has been proposed for the purpose of obviating such cross modulation. In this system, a plurality of image signals from a signal source 1 respectively modulate the amplitude of the carriers assigned to the respective image signals, from high-frequency oscillators 5 to 7 in AM modulators 2 to 4. The polarities of the respective image signals from the signal source 1 are inverted in inverters 8 to 10 and summed up by an adder 11. The output signals from the adder 11 modulates the amplitude of an assigned carrier from a high-frequency oscillator 13 in an AM modulator 12. The output signals from the AM modulators 2 to 4 and 12 are mixed by a mixer 14 and are then amplified by an amplifier 15 so that the amplified signal is applied to an acoustic optical element 16. The acoustic optical element 16 diffracts a laser beam 17 by Bragg diffraction and produces diffracted lights of first order 18 to 21 corresponding to the output signals from the AM modulators 2 to 4 and 12, and a light of zero order 22. Of the multiple diffracted light beams 18 to 21, the light beam 21 which corresponds to an output signal of the AM modulator 12 is cut out by a light cut plate 23, so that only the light beam 18 to 20 corresponding to the image signals are taken out.

In this system, the output signals modulated by the image signals and the output signals modulated by the image signals whose polarities are inversed are applied to the acoustic optical element 16. Therefore, the light modulation intensity by each image signals becomes constant, without being influenced by other image signals, so that cross modulation between the respective beams occurs less. However, since the respective polarities of a plurality of image signals from the signal source 1 are first inversed by the inverters 8 to 10 and are then added by the adder 11, the necessary electric circuits become complicated. Furthermore, there exist as many image signals as the corresponding multiple beams 18 to 20, and the dynamic range of each beam is equal, but the AM modulators 2 to 4, the amplifier 15 and the acoustic optical element 16 have their own frequency bands which are not flat, and the respective beams more or less influence each other. Therefore, the characteristics ratio of image signal to light output are not always identical.

SUMMARY OF THE INVENTION

For the foregoing reason, a principal object of the present invention is to provide a simultaneous multi-beam light modulation system capable of removing cross modulation of beams and correcting the characteristics of the image signal to light output ratio (image signal:light output), so that the above-mentioned shortcomings of the conventional simultaneous multi-beam light modulation system are eliminated.

According to the present invention, a dummy signal is produced in such a manner that the sum of a plurality of signals and the dummy signal is constant, and the amplitude of carriers assigned to the signals and the dummy signal are respectively modulated by the signals and the dummy signal, so that a modulated output produced by the above-mentioned procedure is applied to an acoustic optical element. Cross modulation of beams is thus minimized. Furthermore, since the dummy signal is produced by an addition and inversion of a plurality of signals and a setting signal, the dummy signal can be produced by one circuit. Therefore, an electric circuit necessary for producing the dummy signal is very simple. Also, the gain of each modulated output can be controlled by a gain control means so that the input and output characteristics can be controlled with respect to each beam.

Accordingly, an object of the present invention is to provide an improvement in simultaneous multi-beam optical modulation systems having a signal source for producing a plurality of image signals, a plurality of amplitude modulators connected to the signal source each for modulating one of the image signals, a high-frequency carrier oscillator connected to each of the modulators for producing a carrier to modulate each image signal and an acoustic optical element for deflecting light connected to each of the amplitude modulator for producing a plurality of output light beams each corresponding with one of the image signals, the improvement comprising, addition-reduction inverting means connected to the signal source for receiving each of the image signals, setting voltage means connected to said addition-reduction inverting means for supplying a setting voltage which is of opposite polarity to the image signals, to said addition-reduction inverting means, said setting voltage provided for setting the overall deflection efficiency of the acoustic optical element, means in said addition-reduction inverting means for adding said setting voltage to the image signals to produce a sum and inverting said sum to produce a dummy signal, and assigned amplitude modulator connected to said addition-reduction inverting means for receiving said dummy signal, a high-frequency carrier oscillator connected to said assigned amplitude modulator for modulating said dummy signal, and gain control means connected between each of said amplitude modulators and the acoustic optical element for adjustably amplifying each of said modulated image signals to equalize the intensity of the output light beams produced by the acoustic optical element.

Another object of the present invention is to provide, in a simultaneous multi-beam optical modulation system, a process comprising producing a plurality of image signals, modulating each of said image signals with a carrier to produce a modulated image signal, providing a setting voltage of polarity opposite to that of the image signal, adding each of the image signals to each other and to the setting voltage for producing a sum, inverting the sum to produce a dummy signal, modulating the dummy signal with an assigned carrier to produce a modulated dummy signal, mixing each of said modulated image signals and modulated dummy signal to each other to produce a combined signal, providing an acoustic optical element for receiving the combined signal and producing a plurality of output light beams corresponding to said image signals and said dummy signal, and adjustably amplifying each of said modulated image signals to render the intensity of each of said corresponding light beams equal.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

For a better understanding of the invention as well as the object and other features, reference will be had to the following detailed description which is to be read in conjunction with the drawings wherein.

DETAILED DESCRIPTION OF THE PREFERRED EMBODIMENTS

Figure 2:
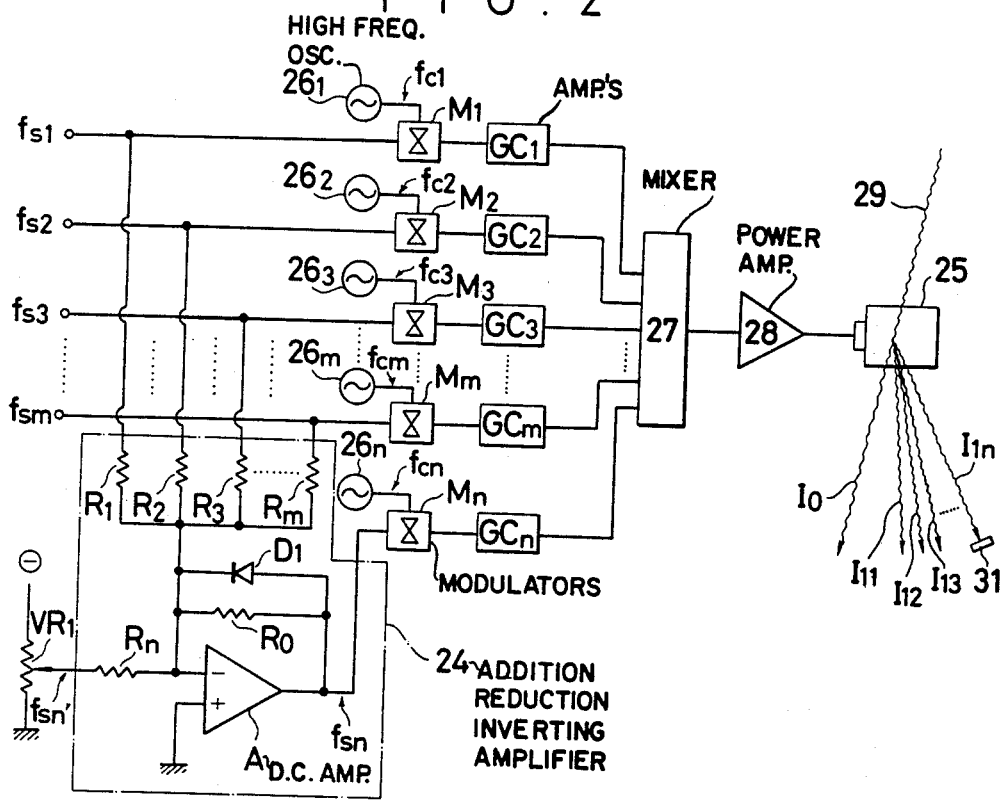
FIG. 2 is a block diagram of an embodiment of a simultaneous multi-beam light modulation system according to the present invention.

The minimizing of cross modulation between beams in a simultaneous multi-beam light modulation system can be attained by use of an acoustic optical element having a broad frequency band. The intensity of the overall deflection of first order light is kept constant, irrespective of input of the image signals, and when the employed frequency band is broad. Since the characteristics of image signal input: deflection of light of the first order do not differ so much in each beam, a system capable of reducing cross modulation can be realized by keeping the sum of the input of image signals constant. In an embodiment of a simultaneous multi-beam light modulation system according to the present invention, the sum of output beams $I_{11}$ to $I_{1m}$ and a dummy beam $I_{1n}$, namely $\Sigma I_1 = I_{11} + I_{12} + \ldots I_{1m} + I_{1n}$, is kept constant. In order to accomplish this, a dummy signal voltage $f_{sn}$ is produced in such a manner as to make the sum of image signal input voltages $f_{s1}$ to $f_{sm}$ and dummy signal voltage $f_{sn}$, namely $\Sigma f_{s3} = f_{s1} + f_{s2} + f_{sm} \ldots + f_{sn}$, constant. To be more specific, referring to FIG. 2, an addition-reduction inverting amplifier 24 comprising resistors $R_0$ to $R_n$ (where $R_0 = R_1 = R_2 = R_3 = \ldots R_n$), a diode $D_1$ and a direct current amplifier A, performs addition of the image signal input voltages $f_{s1}$ to $f_{sm}$ and reduction of a setting voltage $f_{sn'}$. Inverse amplification of the image signal input voltages $f_{s1}$ to $f_{sm}$ and the setting voltage $f_{sn'}$ is also performed. The setting voltage $f_{sn'}$ is a voltage for setting the overall deflection efficiency of an acoustic optical element 25 and is produced in a setting voltage means or setting means by dividing a power source whose polarity is opposite to that of the image signal input voltages $f_{s1}$ to $f_{sm}$ by use of a resistor $VR_1$. In other words, the addition-reduction inverting amplifier or means 24 produces the dummy signal $f_{sn}$ by addition of the image signal input voltages $f_{s1}$ to $f_{sm}$ and the setting voltage $-f_{sn'}$, followed by inversion thereof, namely $f_{sn} = -\{(f_{s1} + f_{s2} + \ldots + f_{sm}) - f_{sn'}\}$.

Figure 3:
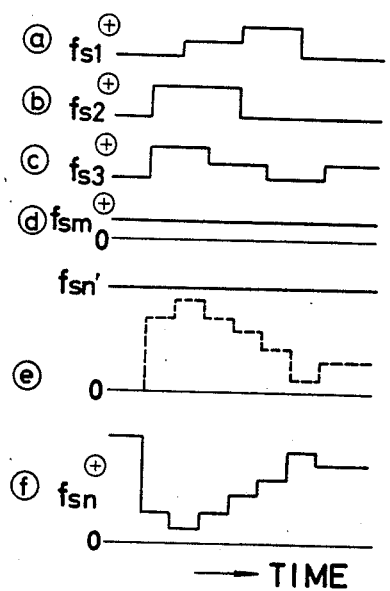
FIG. 3 is a timing chart of the embodiment according to the present invention.

Referring to FIGS. 3 (a) to (d), there are shown the image signal input voltages $f_{s1}$ to $f_{sm}$. In FIG. 3 (e), the dotted lines indicate the sum $f_{s1} + f_{s2} + \ldots + f_{sm}$, and the solid line indicates $f_{sn'}$. FIG. 3 (f) shows the dummy signal $f_{sn}$. Thus, in the present invention, addition of the image signal input voltages $f_{s1}$ to $f_{sm}$ and the setting voltage $-f_{sn'}$ and their inversion can be performed by one element 24. Furthermore, even if the number of beams or the number of image signals increases, such addition or inversion can be performed by increasing only the number of the resistors $R_1$ to $R_m$. The necessary circuits therefore do not become complicated. The diode $D_1$ constitutes a protective circuit for prohibiting generation of a negative output.

The thus produced dummy signal $f_{sn}$ and the image signals $f_{s1}$ and $f_{s2}$ modulates the amplitude of carriers $f_{c1}$ to $f_{cm}$ and $f_{cn}$ with modulators $M_1$ to $M_m$ and $M_n$. The carriers are respectively produced by high-frequency oscillators $26_1$ to $26_m$ and $26_n$. The dummy signal $f_{sn}$ is modulated by assigned carrier $f_{cn}$ in assigned modulator $M_n$. The output signals of the modulators $M_1$ to $M_n$ are summed up into one signal by a mixer 27 through gain control amplifiers $GC_1$ to $GC_n$. The summed signal is amplified by a power amplifier 28 and is then applied to an acoustic optical element 25. Amplifiers $GC_1$ to $GC_n$ with amplifier 28 and mixer 27 comprise a gain control means. The acoustic optical element 25 divides and modulates a laser beam 29 from a laser generating apparatus (not shown) and produces deflected light beams of first order, $I_{11}$ to $I_{1m}$ and $I_{1n}$ which respectively correspond to the image signals $f_{s1}$ to $f_{sm}$ and the dummy signal $f_{sn}$, and a light beam of zero order $I_0$. Of the deflected light beams of first order $I_{11}$ to $I_{1n}$, the deflected light beam $I_{1n}$ corresponding to the dummy signal $f_{sn}$ is unnecessary. Thus, it is cut out by a light blocking plate 31.

Figure 1:
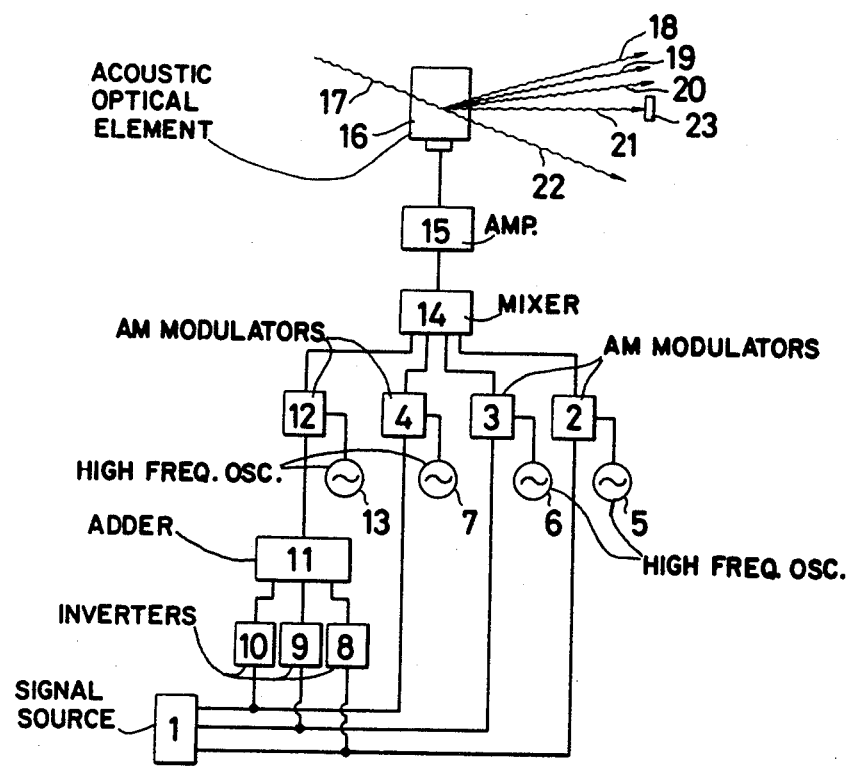
FIG. 1 is a block diagram of a conventional simultaneous multi-beam light modulation system.
Figure 4:
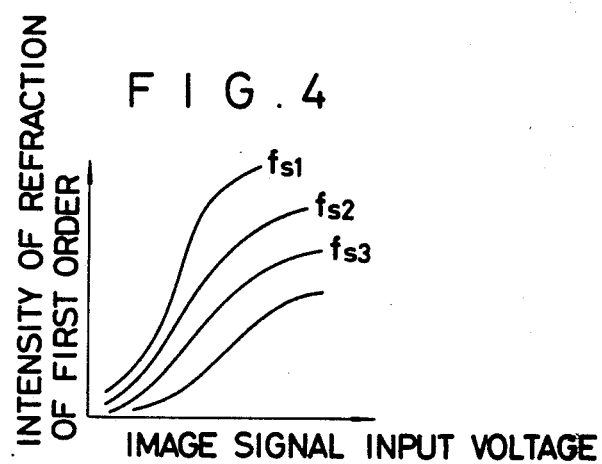
FIG. 4 is a graph showing the characteristics of the image signal input voltage plotted against the intensity of refraction of first order.
Figure 5:
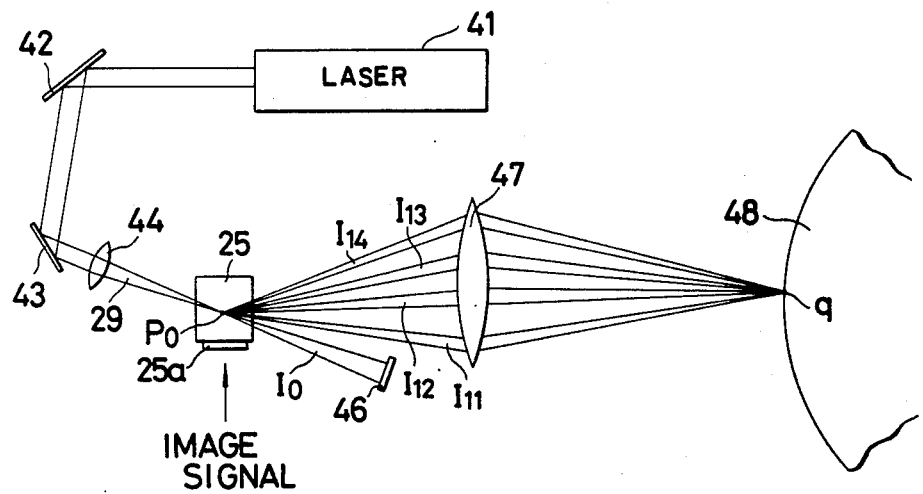
FIG. 5 shows schematically an example of multi-beam simultaneous scanning apparatus that can be employed in conjunction with the simultaneous multi-beam light modulation system according to the present invention.

When the dynamic ranges of the image signals $f_{s1}$ to $f_{sm}$ are made equal, the characteristics of image signal to first order deflected light or intensity of refraction of the first order, are scattered with respect to each beam as shown in FIG. 4. This scattering is caused by the employed electric circuits, the frequency band of the acoustic optical element 25 and cross modulation between the beams. Since the scattering of the characteristics of image signal the first order deflected light is caused by the difference of the gain or the gradient of the input and output characteristics, the gain control amplifiers $GC_1$ to $GC_n$ are adjusted so that the input and output characteristics of the respective beams are in agreement. By such adjustment, the first order deflected lights $I_{11}$ to $I_{1n}$ having an equal intensity are obtained from the image signals $f_{s1}$ to $f_{sm}$ having an equal intensity. A variable resistor is employed as a resistor $VR_1$ for setting the overall first order deflected light in FIG. 2, so that the overall first order deflected light can be changed in accordance with the dynamic range of each image signal when the dynamic range is changed. When the first order deflected lights $I_{11}$ to $I_{1n}$ are recorded on a photoconductive material for the purpose of reading by a computer output apparatus, a facsimile apparatus or a copying apparatus, a multi-beam simultaneous scanning apparatus as shown in FIG. 5 can be employed. In FIG. 5, the laser beam 29 from a laser source 41 is focussed by a focussing lens means or system 44 and is injected into the acoustic optical element 25 which is located at a focussing point of the laser beam 29.

In the figure, reference numerals 42 and 43 indicate plane reflectors. A plurality of image signals, namely four image signals in FIG. 5, are applied to a transducer 25a of the acoustic optical element 25.

Assuming high-frequency carriers for the respective image signals are, for instance, $\cos 2\pi f_1 t$, $\cos 2\pi f_2 t$, $\cos 2\pi f_3 t$, $\cos 2\pi f_4 t$ and that information signals for performing amplitude modulation of these high-frequency carriers are $a_1(t)$, $a_2(t)$, $a_3(t)$, and $a_4(t)$, the image signals are applied to the transducer 25a in the form of $$\sum_{i=1}^{4} a_i(t) \cos 2\pi f_i t.$$

Then, the first order deflected light beams $I_{11}$, $I_{12}$, $I_{13}$, $I_{14}$ come out in the respective directions in accordance with the respective frequencies $f_1$ to $f_4$. These first order deflected lights $I_{1i}$ ($i=1$ to 4) are modulated in their intensities by their corresponding information signals $a_i(t)$ ($i=1$ to 4).

The zero order light beam $I_0$ which comes out of the acoustic optical element 25 is cut out by a stopper 46.

The first order deflected light beams $I_{11}$ to $I_{14}$ enter a focussing lens system 47 and are focussed near a point q on a photoconductive recording material 48. In practice, a deflecting means such as a galvanometer, is placed between the acoustic optical element 25 and the recording material 48, so that the abovementioned deflected light beams $I_{1i}$ ($i=1$ to 4) are deflected for scanning the recording material 48 in the direction normal to FIG. 5.

Figure 6:
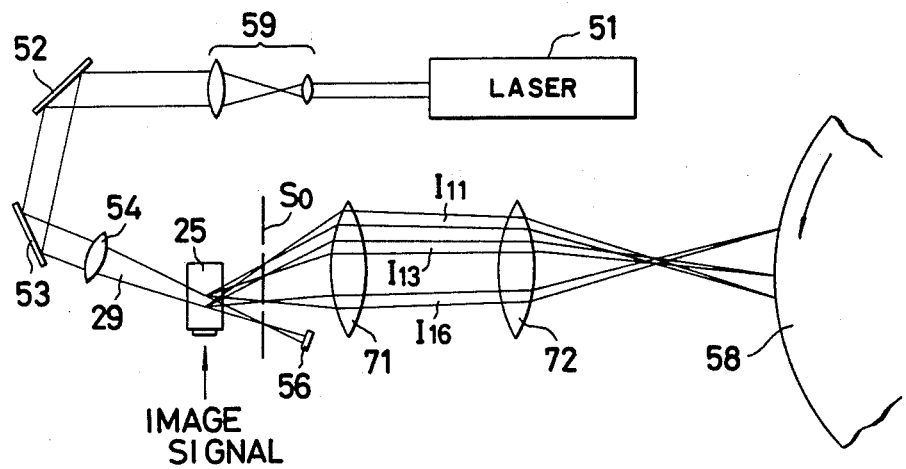
FIG. 6 shows schematically another example of multi-beam simultaneous scanning apparatus that can be employed in conjunction with the simultaneous multi-beam light modulation system according to the present invention.

Referring to FIG. 6, there is shown another example of multi-beam simultaneous scanning apparatus for use with the present invention. In the figure, reference numeral 51 indicates a laser source and reference numerals 52 and 53 indicate plane reflectors. Reference numeral 54 indicates a focussing lens system and reference numeral 25 indicates an acoustic optical element. The above-mentioned members are substantially identical with those in the apparatus shown in FIG. 5.

The multi-beam simultaneous scanning apparatus in FIG. 6 is for writing six lines by a simultaneous scanning. An He-Ne laser is employed as the laser source 51, and $PbMoO_4$ is used as a crystal in the acoustic optical element 25. As the focussing lens system 54, a focussing lens system with a 120 mm focal length is employed. High-frequency carriers with frequencies $f_1=150$ MHz, $f_2=167$ MHz, $f_3=184$ MHz, $f_4=201$ MHz, $f_5=218$ MHz, and $f_6=235$ MHz are employed. Six first order deflected light beams $I_{11}$, $I_{12}$, ... $I_{16}$ come out of the acoustic optical element 25 which is positioned, 80 mm away from the focussing lens system 54, on the optical axis of the focussing lens system 54, and are focussed on a plane $S_0$ with a 60 $\mu m$ space therebetween. For simplification, only the deflected light beams $I_{11}$, $I_{13}$ and $I_{16}$ are shown in FIG. 6.

Reference numeral 59 indicates a beam expander. The diameter of the laser beam from the laser source 51 is enlarged by the beam expander 59 and is then caused to enter the focussing lens system 54.

Reference numeral 71 indicates a lens system, and reference numeral 72 indicates a f-$\theta$ lens system. These two lens systems 71 and 72 constitute another focussing lens system.

As a deflecting means, a rotary multi-mirror device (not shown) is placed between the lens system 71 and f-$\theta$ lens system 72.

In order that the first order deflected light beams $I_{1i}$ ($i=1$ to 6) are focussed, with a 83 $\mu m$ space therebetween, on a recording material 58, by the focussing lens system comprising the lens system 71 and the f-$\theta$ lens system 72, the synthesizing magnification ratio in the focussing lens system has to be 1.33.

In the case where the lens system 71 with a 184 mm focal length and the f-$\theta$ lens system 72 with a 245.8 mm focal length and with a 33 mm distance between its lens surface and its second principal point are employed, in order to satisfy the above-mentioned condition, the object focal plane of the lens system 71 is caused to coincide with the surface $S_0$ and the distance between the lens system 71 and the image side principal point of the f-$\theta$ lens system 72 is set at 200 mm and the position of the recording material is determined in such a manner that the scanning surface of the recording material 58 is caused to coincide with the image side focal plane of the f-$\theta$ lens system 72.

The rotary multi-mirror used as the deflecting means is positioned in such a manner that its beam deflection center comes to a position spaced from the object side lens surface of the f-$\theta$ lens system by 30 mm.

The recording material 58 is a photoconductive drum. The surface of the photoconductive drum is uniformly charged and the scanning of six lines is performed simultaneously on the charged surface in the direction normal to FIG. 6 under the rotation of the photoconductive drum in the direction of the arrow, whereby a latent electrostatic image corresponding to an image signal is formed on the surface of the photoconductive drum.

The thus formed latent image is rendered visible by toner. The visible toner image is transferred and then fixed to a recording sheet, whereby a recording image corresponding to the image signal can be obtained.

By adjusting the beam diameter magnification of the beam expander 59, fine adjustment of the spot diameter of the focal point of the beam can be performed. Furthermore, by adjusting the frequency of carrier applied to the acoustic optical element or by moving minutely the position of the f-$\theta$ lens system along its optical axis, fine adjustment of the line space for writing-out scanning can be performed.

While specific embodiments of the invention have been shown and described in detail to illustrate the application of the principles of the invention, it will be understood that the invention may be embodied otherwise without departing from such principles.

What is claimed is:

1. In a simultaneous multi-beam optical modulation process comprising the steps of obtaining a plurality of modulated signals with the amplitude of carriers having different frequencies modulated by a plurality of signals, and driving an acoustic optical element by said modulated signals, whereby a light modulation is performed by said acoustic optical element, the improvement comprising the steps of producing a dummy signal by adding and then inverting a plurality of said signals and a setting voltage for setting an overall deflection efficiency of said acoustic optical element, the polarity of said setting voltage being opposite to that of said signals, modulating the amplitude of an assigned carrier by said dummy signal and obtaining a modulated output, summing up said modulated output and said modulated signals into a summed up signal through a gain control means, and applying said summed up signal to said acoustic optical element.

* * * * *